US009653886B2

(12) United States Patent
Chiera et al.

(10) Patent No.: US 9,653,886 B2
(45) Date of Patent: May 16, 2017

(54) CAP SHIELDED IGNITION SYSTEM

(71) Applicant: Woodward, Inc., Fort Collins, CO (US)

(72) Inventors: Domenico Chiera, Fort Collins, CO (US); Gregory James Hampson, Boulder, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 14/664,431

(22) Filed: Mar. 20, 2015

(65) Prior Publication Data

US 2016/0276810 A1    Sep. 22, 2016

(51) Int. Cl.
*H01T 13/06* (2006.01)
*H01T 13/20* (2006.01)
(Continued)

(52) U.S. Cl.
CPC .......... *H01T 13/06* (2013.01); *F02B 19/1004* (2013.01); *F02B 19/1095* (2013.01);
(Continued)

(58) Field of Classification Search
CPC ........ H01T 13/20; H01T 13/32; H01T 13/06; H01T 13/54; F02B 19/1004; F02B 19/1095
See application file for complete search history.

(56) References Cited

U.S. PATENT DOCUMENTS

| 892,296 A | 6/1908 | Oberhansli |
| 1,009,867 A | 11/1911 | Terry |

(Continued)

FOREIGN PATENT DOCUMENTS

| AT | 410007 | 1/2003 |
| AT | 509876 | 12/2011 |

(Continued)

OTHER PUBLICATIONS

Fino Scholl et al., "Development and Analysis of a Controlled Hot Surface Ignition System for Lean Burn Gas Engines" Proceedings of the ASME 2012 Internal Combustion Engine Division Spring Technical Conference ICES2012, May 6-9, 2012 (12 pages).

(Continued)

*Primary Examiner* — Jacob Amick
(74) *Attorney, Agent, or Firm* — Fish & Richardson P.C.

(57) ABSTRACT

A system for igniting a mixture in an internal combustion engine includes an elongate plug body generally residing around a center longitudinal axis and adapted to couple to the internal combustion engine. The system also includes a first ignition body residing about an end of the plug body and a second ignition body adjacent the first ignition body to define a flame kernel initiation gap between the second ignition body and the first ignition body. The system also includes a transversely extending cap at the end of the plug body that is longitudinally spaced from the plug body by a support comprising a leg that is radially offset from the center longitudinal axis, the support defining a peripheral opening around a perimeter of the cap where a total radially-facing area of the support is less than a total area of the peripheral opening.

18 Claims, 7 Drawing Sheets

(51) Int. Cl.
  *F02B 19/10* (2006.01)
  *F02B 19/12* (2006.01)
  *F02P 13/00* (2006.01)
  *H01T 13/32* (2006.01)
  *H01T 13/54* (2006.01)

(52) U.S. Cl.
  CPC .............. *F02B 19/12* (2013.01); *F02P 13/00* (2013.01); *H01T 13/20* (2013.01); *H01T 13/32* (2013.01); *H01T 13/54* (2013.01)

(56) References Cited

U.S. PATENT DOCUMENTS

| | | | |
|---|---|---|---|
| 1,242,375 | A | 10/1917 | Robinson |
| 1,253,570 | A | 1/1918 | Berry |
| 1,320,115 | A | 10/1919 | Bloomhuff et al. |
| 1,322,493 | A | 11/1919 | Little |
| 1,325,439 | A | 12/1919 | Dinger |
| 1,360,294 | A | 11/1920 | Hill |
| 1,361,347 | A | 12/1920 | Nighswander |
| 1,361,580 | A | 12/1920 | Herz |
| 1,538,750 | A | 5/1925 | Scognamillo |
| 1,594,773 | A | 8/1926 | French |
| 1,596,240 | A | 8/1926 | Dikeman |
| 1,611,856 | A * | 12/1926 | Farnsworth ............ H01T 13/32 174/152 S |
| 1,700,603 | A | 1/1929 | Vreeland et al. |
| 1,732,827 | A | 10/1929 | Adam |
| 1,748,338 | A | 2/1930 | Georgias |
| 1,963,801 | A | 6/1934 | O'Marra |
| 2,047,575 | A | 7/1936 | Burtnett |
| 2,127,513 | A | 8/1938 | Harper, Jr. |
| 2,153,598 | A | 4/1939 | Steward |
| 2,208,030 | A | 7/1940 | Holmes |
| 2,231,173 | A | 2/1941 | Starr |
| 2,299,924 | A | 10/1942 | Ost |
| 2,314,128 | A | 3/1943 | Coldwell |
| 2,416,107 | A | 2/1947 | Litton |
| 2,456,080 | A | 12/1948 | Wu Pe |
| 2,487,535 | A | 11/1949 | Fernandez |
| 2,497,862 | A | 2/1950 | Chuy |
| 2,509,538 | A | 5/1950 | Sues |
| 2,586,864 | A | 2/1952 | Rose |
| 2,614,546 | A | 10/1952 | Schwarz |
| 2,673,554 | A | 3/1954 | Thaheld |
| 2,758,576 | A | 8/1956 | Schlamann |
| 2,776,394 | A | 1/1957 | Cuny et al. |
| 2,843,780 | A | 7/1958 | Harper, Jr. |
| 2,895,069 | A | 7/1959 | Davis |
| 2,899,585 | A | 8/1959 | Dollenberg |
| 2,957,099 | A | 10/1960 | Dutterer |
| 3,230,939 | A | 1/1966 | Abramovich |
| 3,270,722 | A | 9/1966 | Springer |
| 3,300,672 | A | 1/1967 | Fisher |
| 3,665,902 | A | 5/1972 | Bloomfield |
| 3,710,764 | A | 1/1973 | Jozlin |
| 3,718,425 | A | 2/1973 | Weyl et al. |
| 3,911,874 | A | 10/1975 | Vincent |
| 3,911,878 | A | 10/1975 | Hofbauer et al. |
| 3,958,144 | A | 5/1976 | Franks |
| 4,004,413 | A | 1/1977 | Ueno |
| 4,091,772 | A | 5/1978 | Heater |
| 4,092,558 | A | 5/1978 | Yamada |
| 4,098,232 | A | 7/1978 | Gleiter |
| 4,123,998 | A | 11/1978 | Heintzelman |
| 4,124,000 | A | 11/1978 | Genslak |
| 4,125,094 | A | 11/1978 | Noguchi et al. |
| 4,218,993 | A | 8/1980 | Blackburn |
| 4,232,638 | A | 11/1980 | Takahashi |
| 4,248,189 | A | 2/1981 | Barber et al. |
| 4,248,192 | A | 2/1981 | Lampard |
| 4,372,264 | A | 2/1983 | Trucco |
| 4,398,513 | A | 8/1983 | Tanasawa |
| 4,406,260 | A | 9/1983 | Burley |
| 4,416,228 | A | 11/1983 | Benedikt et al. |
| 4,424,780 | A | 1/1984 | Trucco |
| 4,429,669 | A | 2/1984 | Burley |
| 4,441,469 | A | 4/1984 | Wilke |
| 4,452,189 | A | 6/1984 | Latsch et al. |
| 4,490,122 | A | 12/1984 | Tromeur |
| 4,509,476 | A | 4/1985 | Breuser et al. |
| 4,532,899 | A | 8/1985 | Lorts |
| 4,641,616 | A | 2/1987 | Lampard |
| 4,646,695 | A | 3/1987 | Blackburn |
| 4,744,341 | A | 5/1988 | Hareyama et al. |
| 4,765,293 | A | 8/1988 | Gonzalez |
| 4,795,937 | A | 1/1989 | Wagner et al. |
| 4,854,281 | A | 8/1989 | Hareyama et al. |
| 4,901,688 | A | 2/1990 | Kashiwara et al. |
| 4,930,473 | A | 6/1990 | Dietrich |
| 4,963,784 | A | 10/1990 | Niessner |
| 4,987,868 | A | 1/1991 | Richardson |
| 5,014,656 | A | 5/1991 | Leptich et al. |
| 5,051,651 | A | 9/1991 | Kashiwara et al. |
| 5,067,458 | A | 11/1991 | Bailey |
| 5,076,229 | A | 12/1991 | Stanley |
| 5,091,672 | A | 2/1992 | Below |
| 5,105,780 | A | 4/1992 | Richardson |
| 5,107,168 | A | 4/1992 | Friedrich et al. |
| 5,222,993 | A | 6/1993 | Crane |
| 5,224,450 | A | 7/1993 | Paul et al. |
| 5,239,959 | A | 8/1993 | Loth et al. |
| 5,245,963 | A | 9/1993 | Sabol et al. |
| 5,271,365 | A | 12/1993 | Oppenheim |
| 5,369,328 | A | 11/1994 | Gruber et al. |
| 5,408,961 | A | 4/1995 | Smith |
| 5,421,300 | A | 6/1995 | Durling et al. |
| 5,430,346 | A * | 7/1995 | Johnson ....................... 313/139 |
| 5,454,356 | A | 10/1995 | Kawamura |
| 5,554,908 | A | 9/1996 | Kuhnert et al. |
| 5,555,862 | A | 9/1996 | Tozzi |
| 5,555,867 | A | 9/1996 | Freen |
| 5,555,868 | A | 9/1996 | Neumann |
| 5,560,326 | A | 10/1996 | Merritt |
| 5,612,586 | A | 3/1997 | Benedikt et al. |
| 5,619,959 | A | 4/1997 | Tozzi |
| 5,623,179 | A | 4/1997 | Buhl |
| 5,632,253 | A | 5/1997 | Paul et al. |
| 5,647,444 | A | 7/1997 | Williams |
| 5,662,181 | A | 9/1997 | Williams et al. |
| 5,678,517 | A | 10/1997 | Chen et al. |
| 5,715,788 | A | 2/1998 | Tarr |
| 5,791,374 | A | 8/1998 | Black et al. |
| 5,799,637 | A | 9/1998 | Cifuni |
| 5,803,026 | A | 9/1998 | Merritt |
| 5,821,675 | A | 10/1998 | Suzuki |
| 5,829,407 | A | 11/1998 | Watson |
| 5,892,319 | A | 4/1999 | Rossi |
| 5,947,076 | A | 9/1999 | Srinivasan et al. |
| 6,013,973 | A | 1/2000 | Sato |
| 6,060,822 | A | 5/2000 | Krupa et al. |
| 6,064,144 | A | 5/2000 | Knoll et al. |
| 6,095,111 | A | 8/2000 | Ueda |
| 6,129,069 | A | 10/2000 | Uitenbroek |
| 6,129,152 | A | 10/2000 | Hosie et al. |
| 6,130,498 | A | 10/2000 | Shimizu et al. |
| 6,198,209 | B1 | 3/2001 | Baldwin et al. |
| 6,279,550 | B1 | 8/2001 | Bryant |
| 6,302,067 | B1 | 10/2001 | Merritt |
| 6,305,346 | B1 | 10/2001 | Ueda et al. |
| 6,318,335 | B2 | 11/2001 | Tomczyk |
| 6,326,719 | B1 | 12/2001 | Boehler et al. |
| 6,340,013 | B1 | 1/2002 | Britton |
| 6,460,506 | B1 | 10/2002 | Nevinger |
| 6,495,948 | B1 | 12/2002 | Garret, III |
| 6,554,016 | B2 | 4/2003 | Kinder |
| 6,574,961 | B2 | 6/2003 | Shiraishi |
| 6,595,182 | B2 | 7/2003 | Oprea |
| 6,611,083 | B2 | 8/2003 | LaBarge et al. |
| 6,670,740 | B2 | 12/2003 | Landon, Jr. |
| 6,749,172 | B2 | 6/2004 | Kinder |
| 6,830,017 | B2 | 12/2004 | Wolf et al. |
| 6,913,092 | B2 | 7/2005 | Bourgoyne et al. |
| 7,004,444 | B2 | 2/2006 | Kinder |

(56) References Cited

U.S. PATENT DOCUMENTS

| | | |
|---|---|---|
| 7,007,661 B2 | 3/2006 | Warlick |
| 7,007,913 B2 | 3/2006 | Kinder |
| 7,025,036 B2 | 4/2006 | Lampard |
| 7,086,376 B2 | 8/2006 | McKay |
| 7,100,567 B1 | 9/2006 | Bailey et al. |
| 7,104,245 B2 | 9/2006 | Robinet et al. |
| 7,367,307 B2 | 5/2008 | Lampard |
| 7,370,626 B2 | 5/2008 | Schubert |
| 7,408,293 B2 | 8/2008 | Francesconi et al. |
| 7,409,933 B2 | 8/2008 | Nino |
| 7,438,043 B2 | 10/2008 | Shiraishi |
| 7,615,914 B2 | 11/2009 | Francesconi et al. |
| 7,628,130 B2 | 12/2009 | Johng |
| 7,659,655 B2 | 2/2010 | Tozzi et al. |
| 7,762,320 B2 | 7/2010 | Williams |
| 7,848,871 B2 | 12/2010 | Onishi |
| 7,856,956 B2 | 12/2010 | Inoue et al. |
| 7,891,426 B2 | 2/2011 | Williams |
| 7,922,551 B2 | 4/2011 | Tozzi |
| 7,950,364 B2 | 5/2011 | Nerheim |
| 8,033,335 B2 | 10/2011 | Orbell et al. |
| 8,143,772 B2 | 3/2012 | Francesconi |
| 8,181,617 B2 | 5/2012 | Kuhnert et al. |
| 8,261,711 B2 | 9/2012 | Shimoda |
| 8,286,734 B2 | 10/2012 | Hannegan et al. |
| 8,313,324 B2 | 11/2012 | Bulat et al. |
| 8,322,432 B2 | 12/2012 | Bailey et al. |
| 8,353,337 B2 | 1/2013 | Bailey et al. |
| 8,387,587 B2 | 3/2013 | Ogata |
| 8,499,854 B2 | 8/2013 | Mitchell et al. |
| 8,584,648 B2 | 11/2013 | Chiera et al. |
| 8,733,331 B2 | 5/2014 | McAlister |
| 8,757,129 B1 | 6/2014 | Hill |
| 8,800,536 B2 | 8/2014 | Plata |
| 8,839,762 B1 | 9/2014 | Chiera et al. |
| 8,857,405 B2 | 10/2014 | Attard |
| 8,890,396 B2 | 11/2014 | Ernst et al. |
| 8,924,136 B2 | 12/2014 | Nakamoto |
| 8,925,518 B1 | 1/2015 | Riley |
| 9,172,216 B2 | 10/2015 | Ernst |
| 2004/0061421 A1* | 4/2004 | Morita et al. ............ 313/142 |
| 2004/0100179 A1 | 5/2004 | Boley et al. |
| 2004/0123849 A1 | 7/2004 | Bryant |
| 2005/0000484 A1 | 1/2005 | Schultz et al. |
| 2005/0092285 A1* | 5/2005 | Klonis et al. ............ 123/266 |
| 2005/0211217 A1 | 9/2005 | Boley et al. |
| 2005/0279321 A1 | 12/2005 | Crawford |
| 2006/0005803 A1 | 1/2006 | Robinet et al. |
| 2006/0278195 A1 | 12/2006 | Hotta |
| 2007/0069617 A1 | 3/2007 | Tozzi et al. |
| 2007/0151540 A1 | 7/2007 | Takahashi et al. |
| 2007/0169737 A1 | 7/2007 | Gong et al. |
| 2007/0236122 A1 | 10/2007 | Borror |
| 2007/0261672 A1 | 11/2007 | Lippert |
| 2008/0017165 A1 | 1/2008 | Schubert |
| 2008/0168963 A1 | 7/2008 | Gagliano |
| 2008/0257301 A1 | 10/2008 | Hotta |
| 2009/0236144 A1 | 9/2009 | Todd et al. |
| 2009/0241896 A1 | 10/2009 | Fiveland |
| 2009/0309475 A1 | 12/2009 | Tozzi |
| 2010/0132660 A1 | 6/2010 | Nerheim |
| 2010/0133977 A1 | 6/2010 | Kato |
| 2010/0147259 A1 | 6/2010 | Kuhnert et al. |
| 2011/0036638 A1 | 2/2011 | Sokol et al. |
| 2011/0062850 A1 | 3/2011 | Tozzi |
| 2011/0065350 A1 | 3/2011 | Burke |
| 2011/0089803 A1 | 4/2011 | Francesconi |
| 2011/0148274 A1 | 6/2011 | Ernst |
| 2011/0297121 A1 | 12/2011 | Kraus et al. |
| 2011/0308489 A1 | 12/2011 | Herden |
| 2011/0320108 A1 | 12/2011 | Morinaga |
| 2012/0000664 A1 | 1/2012 | Nas et al. |
| 2012/0013133 A1 | 1/2012 | Rios, III et al. |
| 2012/0064465 A1 | 3/2012 | Borissov et al. |
| 2012/0103302 A1 | 5/2012 | Attard |
| 2012/0118262 A1 | 5/2012 | Johnson |
| 2012/0125279 A1 | 5/2012 | Hampson et al. |
| 2012/0125287 A1 | 5/2012 | Chiera et al. |
| 2012/0125636 A1 | 5/2012 | Linde et al. |
| 2012/0299459 A1 | 11/2012 | Sakakura |
| 2012/0310510 A1 | 12/2012 | Imamura |
| 2013/0000598 A1 | 1/2013 | Tokuoka |
| 2013/0042834 A9 | 2/2013 | Chiera et al. |
| 2013/0047954 A1 | 2/2013 | McAlister |
| 2013/0055986 A1 | 3/2013 | Tozzi et al. |
| 2013/0099653 A1 | 4/2013 | Ernst |
| 2013/0139784 A1 | 6/2013 | Pierz |
| 2013/0160734 A1 | 6/2013 | Redtenbacher et al. |
| 2013/0179050 A1 | 7/2013 | Munshi |
| 2013/0192896 A1 | 8/2013 | Bailey et al. |
| 2013/0206122 A1 | 8/2013 | Chiera et al. |
| 2013/0220269 A1 | 8/2013 | Woo et al. |
| 2014/0076274 A1 | 3/2014 | Tozzi et al. |
| 2014/0083391 A1 | 3/2014 | Gruber |
| 2014/0102404 A1 | 4/2014 | Sotiropoulou et al. |
| 2014/0137840 A1 | 5/2014 | McAlister |
| 2014/0144406 A1 | 5/2014 | Schock |
| 2014/0165980 A1 | 6/2014 | Chiera et al. |
| 2014/0190437 A1 | 7/2014 | Chiera et al. |
| 2014/0209057 A1 | 7/2014 | Pouring |
| 2014/0261294 A1 | 9/2014 | Thomassin |
| 2015/0020769 A1 | 1/2015 | Huang |
| 2015/0040845 A1 | 2/2015 | Chiera et al. |
| 2015/0068489 A1 | 3/2015 | Bunce |
| 2015/0075506 A1 | 3/2015 | Ishida |
| 2015/0128898 A1 | 5/2015 | Osaka |
| 2015/0260131 A1 | 9/2015 | Riley |
| 2015/0267631 A1 | 9/2015 | Miyamoto |
| 2015/0354481 A1 | 12/2015 | Geckler |
| 2016/0010538 A1 | 1/2016 | Suzuki |
| 2016/0017845 A1 | 1/2016 | Huang |
| 2016/0024994 A1 | 1/2016 | Engineer |
| 2016/0047323 A1 | 2/2016 | Suzuki |
| 2016/0053668 A1 | 2/2016 | Loetz |

FOREIGN PATENT DOCUMENTS

| | | |
|---|---|---|
| CA | 1010329 | 5/1977 |
| CA | 2320415 | 3/2001 |
| CN | 2825995 | 10/2006 |
| DE | 31 20 007 | 12/1982 |
| DE | 3230793 | 2/1984 |
| DE | 3913665 | 10/1990 |
| DE | 4422939 | 1/1996 |
| DE | 19624965 | 1/1998 |
| DE | 10143209 | 6/2002 |
| DE | 101 44 976 | 4/2003 |
| DE | 102010004851 | 6/2011 |
| DE | 102011006597 A1 | 3/2012 |
| DE | 102012021842 B4 | 9/2014 |
| EP | 0 675 272 | 10/1995 |
| EP | 0971107 | 1/2000 |
| EP | 1026800 A2 | 8/2000 |
| EP | 1028506 A1 | 8/2000 |
| EP | 0937196 | 9/2000 |
| EP | 1265329 | 12/2002 |
| EP | 1556592 | 10/2003 |
| EP | 1556932 | 7/2005 |
| EP | 1701419 | 9/2006 |
| FI | 121759 | 3/2011 |
| FI | 122501 | 2/2012 |
| FR | 577766 A | 9/1924 |
| FR | 764079 A | 5/1934 |
| FR | 985788 A | 7/1951 |
| FR | 2071129 A5 | 9/1971 |
| FR | 2131938 A2 | 11/1972 |
| FR | 2131938 B2 | 8/1979 |
| FR | 2846042 | 4/2004 |
| GB | 588074 | 5/1947 |
| JP | 50077738 | 6/1975 |
| JP | S5252013 | 4/1977 |
| JP | 57-018283 | 1/1982 |
| JP | 58162719 | 9/1983 |
| JP | H02148588 | 12/1990 |

(56) References Cited

FOREIGN PATENT DOCUMENTS

| | | |
|---|---|---|
| JP | 03-011575 | 1/1992 |
| JP | 4133281 | 5/1992 |
| JP | 4262388 | 9/1992 |
| JP | 08-260970 | 10/1996 |
| JP | 09166024 | 6/1997 |
| JP | 2008-504649 | 2/2006 |
| RU | 2116474 | 7/1998 |
| SU | 968493 | 10/1982 |
| SU | 1370269 | 1/1988 |
| WO | WO 87/07777 | 12/1987 |
| WO | WO 91/06142 | 5/1991 |
| WO | WO 92/02718 | 2/1992 |
| WO | WO 2004/036013 | 4/2004 |
| WO | WO 2004/036709 | 4/2004 |
| WO | WO 2004/107518 | 12/2004 |
| WO | WO 2006/011950 | 2/2006 |
| WO | WO 2009/060119 A1 | 5/2009 |
| WO | WO 2009/109694 A2 | 9/2009 |
| WO | WO 2009/130376 A1 | 10/2009 |
| WO | WO 2010/072519 | 7/2010 |
| WO | WO 2011/031136 | 3/2011 |
| WO | WO 2011/085853 | 7/2011 |
| WO | WO 2011/101541 | 8/2011 |
| WO | WO 2011/128190 | 10/2011 |
| WO | WO 2011/151035 | 12/2011 |
| WO | WO 2012/021914 A1 | 2/2012 |
| WO | WO 2012/091739 | 7/2012 |
| WO | WO2014/201030 | 12/2014 |

OTHER PUBLICATIONS

Sachin Joshi et al., "On Comparative Performance Testing of Prechamber and Open Chamber Laser Ignition" Journal of Engineering for Gas Turbines and Power, Dec. 2011, vol. 133, pp. 122801-1 to 122801-5.
McIntyre, Dustin L., et al., "Lean-Burn Stationary Natural Gas Reciprocating Engine Operation with a Prototype Miniature Diode Side Pumped Passively Q-Switched Laser Spark Plug" U.S. Department of Energy, National Energy Technology Laboratory, 2008, 14 pages.
Dale, J.D. et al., "Enhanced Ignition for I. C. Engines With Premixed Charge," Lawrence Berkeley Laboratory, Society of Automotive Engineers Annual Congress, Oct. 1980, 52 pages.
"New Spark Plug Concepts for Modern-Day Gasoline Engines," Beru Aktiengesellschaft, MTZ vol. 68, Feb. 2007, 8 pages.
BorgWarner BERU Systems Pre-Chamber Technology, 1 page.
BorgWarner BERU Systems, BERU Industrial Spark Plugs, Feb. 2012, 48 pages.
Maria-Emmanuella McCoole, M.Sc.E.E. et al.; Solutions for Improving Spark Plug Life in High Efficiency, High Power Density, Natural Gas Engines; Proceedings of ICES2006; ASME Internal Combustion Engine Division 2006 Spring Technical Conference; May 8-10, 2006, Aachen, Germany; ICES2006-1417; pp. 1-8.
Dr. Luigi Tozzi et al.; Advanced Combustion System Solutions for Increasing Thermal Efficiency in Natural Gas Engines While Meeting Future Demand for Low NOx Emissions; Proceedings of JRCICE2007; 2007 ASME/IEEE Joint Rail Conference & Internal Combustion Engine Spring Technical Conference; Mar. 13-16, 2006, Pueblo, Colorado USA; JRCICE2007-40026; pp. 1-7.
Jessica Adair et al; Knock Characterization Using Ionization Detection; GMRC Gas Machinery Conference; Oklahoma City, Oklahoma; Oct. 2006; pp. 1-23.
Hironori Osamura, Development of Long Life and High Ignitability iridium Spark Plug, Technical Paper, Seoul 2000 FISITA World Automotive Congress; Jun. 12-15, 2000 Seoul, Korea; 6 pages.
Hironori Osamura, Development of New Iridium Alloy for Spark Plug Electrodes; SAE Technical Paper Series; 1999-01-0796; SI Engine Components and Technology (SP-1437); International Congress and Exposition Mar. 1-4, 1999; 14 pages.
"Wartsila 34SG Engine Technology for Compressor Drive," Wartsila Engines, Wartsila Corporation 2009, 16 pages.
Federal Mogul, Champion® Bridge Iridium Spark Plug, Industrial Gas Stationary Engines—High Demand/Premium Market, Jun. 2012, 1 page.
Bosch, Spark Plugs Technical Information, published on or before Nov. 28, 2014, 28 pages.
PCT International Search Report and Written Opinion of the International Searching Authority, PCT/US2016/022559, Jun. 24, 2016, 14 pages.

* cited by examiner

CAP SHIELDED IGNITION SYSTEM

BACKGROUND

Engines operating on gaseous fuels, such as natural gas, are commonly supplied with a lean fuel mixture, which is a mixture of air and fuel containing excess air beyond that which is stoichiometric for combustion. In some engines, multiple chambers within the igniter plug can allow more efficient combustion of lean fuel mixtures. However, bulk flow and turbulence in the vicinity of the flame kernel can tend to extinguish the flame kernel. Bulk flow and turbulence can increase the chance of misfires or failed ignition events. In some cases, electrode quenching can be a problem for combustion stability when using lean mixtures with a prechamber-type igniter plug.

BRIEF DESCRIPTION OF THE DRAWINGS

Like reference symbols in the various drawings indicate like elements.

DETAILED DESCRIPTION

The concepts herein relate to igniting an air/fuel mixture in a combustion chamber of an engine using an igniter with a shielding cap.

Figure 1:
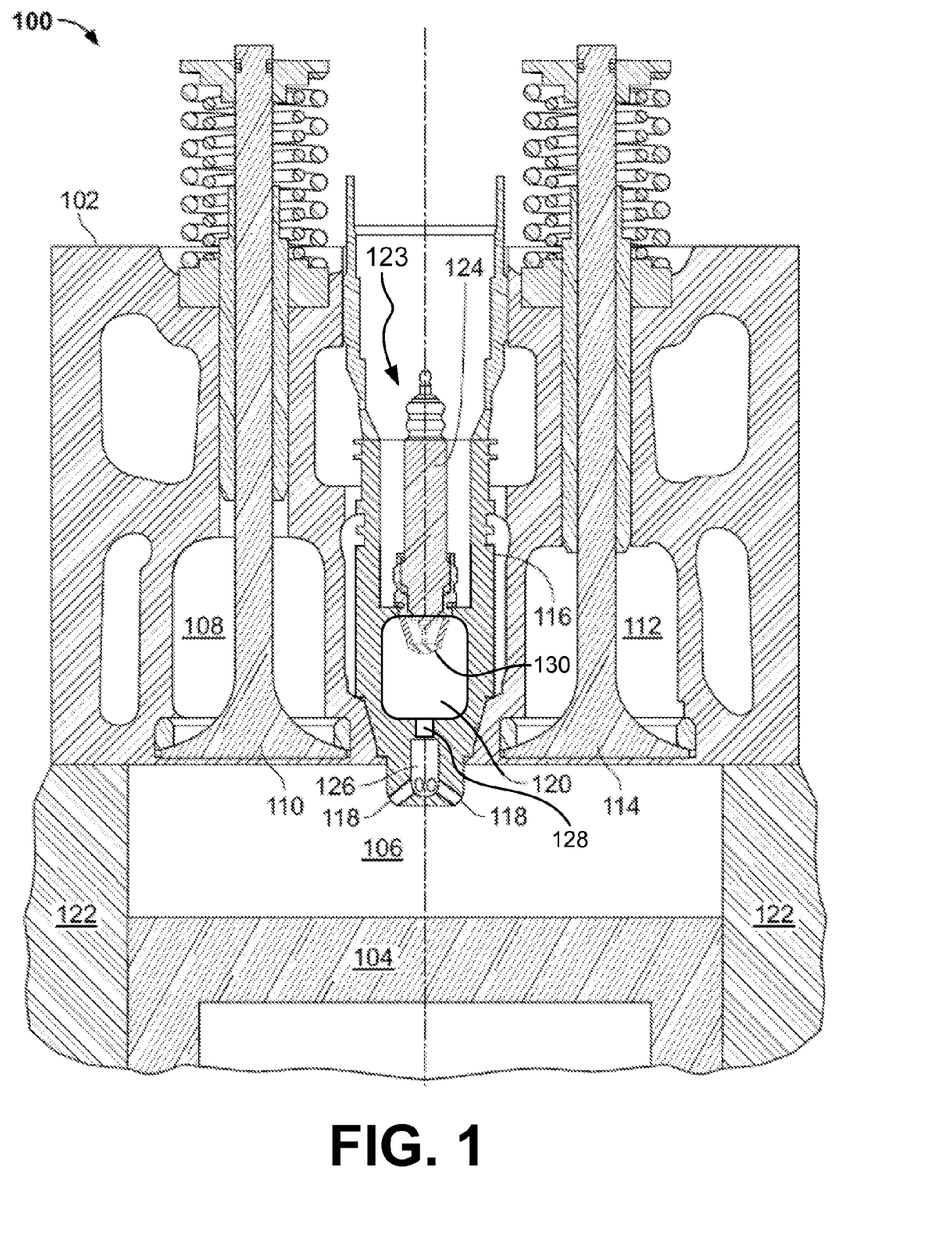
FIG. 1 is a side cross-sectional view of a portion of an internal combustion engine including a shielding cap.

FIG. 1 shows a cross-section of a portion of an example internal combustion engine 100. The example internal combustion engine 100 is a reciprocating engine and includes a head 102, a block 122, and a piston 104. The piston 104 is located inside a cylinder inside the block 122. The piston 104 is able to reciprocate inside the cylinder during engine operation. The combustion chamber 106 is a volume located inside the cylinder between the head 102 and the piston 104, and is bounded by the block 122. FIG. 1 shows a single piston 104, but the internal combustion engine 100 may have multiple pistons 104 with associated components.

The example internal combustion engine 100 includes an intake passage 108 with intake valve 110 and an exhaust passage 112 with exhaust valve 114. The passages 108, 112 are in the head 102 adjacent to the combustion chamber 106, and the valves 110, 114 form part of the walls of the combustion chamber 106. During engine operation, the intake valve 110 opens to let a fresh charge of air/fuel mixture flow from the intake passage 108 into the combustion chamber 106. In other instances, the intake valve 110 admits only air and an in-combustion chamber fuel injector admits fuel to form the air/fuel mixture in the combustion chamber 106. After combustion, the exhaust valve 114 opens to exhaust combustion residuals out of the combustion chamber 106 and into the exhaust passage 112. Although the concepts herein are described herein with respect to a reciprocating internal combustion engine, the concepts could be applied to other internal combustion engine configurations.

The example internal combustion engine 100 includes an example carrier 116 and an igniter plug 123. The carrier 116 is located in the head 102 and is threadingly and/or otherwise coupled to the head 102. In some instances, the carrier 116 can extend into the combustion chamber 106, be flush with a wall of combustion chamber 106, or be recessed from a wall of combustion chamber 106. The example igniter plug 123 is received inside the example carrier 116 and is coupled to the carrier 116 threadingly and/or otherwise. The carrier 116 thus defines an outer enclosure around the igniter plug 123.

The igniter plug 123 is a device configured to initiate a flame kernel to ignite the charge in the combustion chamber 106, such as a spark plug, laser igniter, and/or other type of igniter. The igniter plug 123 resides generally around a center longitudinal axis. The example igniter plug 123 includes a first ignition body and a second ignition body adjacent the first ignition body to define a flame kernel initiation gap. In some cases, the first ignition body and second ignition body are centered about the center longitudinal axis. The example igniter plug 123 includes a plug body 124 and an example shielding cap 130 at the end of the plug body 124. The cap 130 is a body that shields the flame kernel initiation gap from air/fuel mixture flows directed generally in the direction of the center longitudinal axis that would otherwise impinge on the gap and tend to extinguish the flame kernel.

The example igniter plug 123 and carrier 116 of FIG. 1 act as a "prechamber" type igniter in that an antechamber 120 encloses flame kernel initiation (i.e., the first and second ignition bodies and the flame kernel initiation gap). The antechamber 120 is an enclosed chamber or space defined inside the carrier 116. The antechamber 120 is adjacent to but separate from the combustion chamber 106. In some instances, the antechamber 120 can be formed in the head 102 itself and the carrier 116 can be omitted. The antechamber 120 is defined about an end of the igniter plug 123. In other instances, rather than being in a separate carrier 116, the antechamber 120 can be integrated with the igniter plug 123 (e.g., in a common or conjoined housing or enclosure). The antechamber 120 is shown having a symmetrical shape about the center longitudinal axis of the carrier 116 and igniter plug 123, but in other instances it could be an asymmetrical shape. The antechamber 120 includes an internal nozzle portion 128, which extends axially through the antechamber 120 from a central passage 126 toward the igniter plug 123. The internal nozzle portion 128 operates as a jet passage to nozzle a consolidated stream of air/fuel mixture axially through the antechamber 120 and into the igniter plug 123. In some cases, the antechamber 120 includes an internal enlarged portion axially between the internal nozzle portion 128 and the inner chamber, which has a larger transverse dimension than the internal nozzle portion 128. The igniter plug 123, while described in connection with the antechamber 120 in a prechamber configuration in FIG. 1, as will be discussed below, could alternatively be used without antechamber 120 and just extending into the main combustion chamber 106.

The example carrier 116 includes diverging jet apertures 118. The jet apertures 118 include external ends, which terminate at the exterior of the carrier 116 and are nominally located inside the combustion chamber 106. The internal ends of the jet apertures 118 converge to a central passage 126 that opens into the antechamber 120 through the internal nozzle portion 128. The jet apertures 118 can number one or more and can be located on the carrier 116 in a symmetric or asymmetric pattern, diverging from the central passage 126. In some cases, at least one of the jet apertures 118 is parallel (precisely or substantially) to the center longitudinal axis or perpendicular (precisely or substantially) to the center longitudinal axis. In some cases, one of the jet apertures 118 coincides with the center longitudinal axis. In some cases, at least one of the jet apertures 118 are not parallel or perpendicular to the center longitudinal axis. The jet apertures 118 allow charge, flame, and residuals to flow between the antechamber 120 and the combustion chamber 106. The jet apertures 118 and central passage 126 operate as jet passages to nozzle combusting air/fuel mixture from the antechamber 120 into divergent flame jets that reach into the combustion chamber 106 and ignite the charge in the combustion chamber 106. The jet apertures 118 and central passage 126 also direct fresh air/fuel mixture from the combustion chamber 106 into the igniter plug body 124. The central passage 126 directs the flow into a consolidated stream through the internal nozzle portion 128 along the center of the antechamber 120 toward the igniter plug 123.

In operation of the engine 100, the compressive action of the piston 104 forces a portion of the cool (relative to residual combustion gasses), fresh air/fuel mixture to flow from the combustion chamber 106 into the central passage 126 through the jet apertures 118. The central passage 126 receives the incoming air/fuel mixture, converges air/fuel mixture into a consolidated stream, and directs the flow into the internal nozzle portion 128 of the antechamber 120. The internal nozzle portion 128 nozzles the incoming cool, fresh charge into a central high-velocity consolidated stream primarily directed toward the cap 130 of the igniter plug 123. The antechamber 120 receives all of its air/fuel mixture from the main combustion chamber 106. In other instances, the antechamber 120 can have a fuel feed that supplies a portion of the received fuel or air/fuel mixture into the antechamber 120.

Figure 2A:
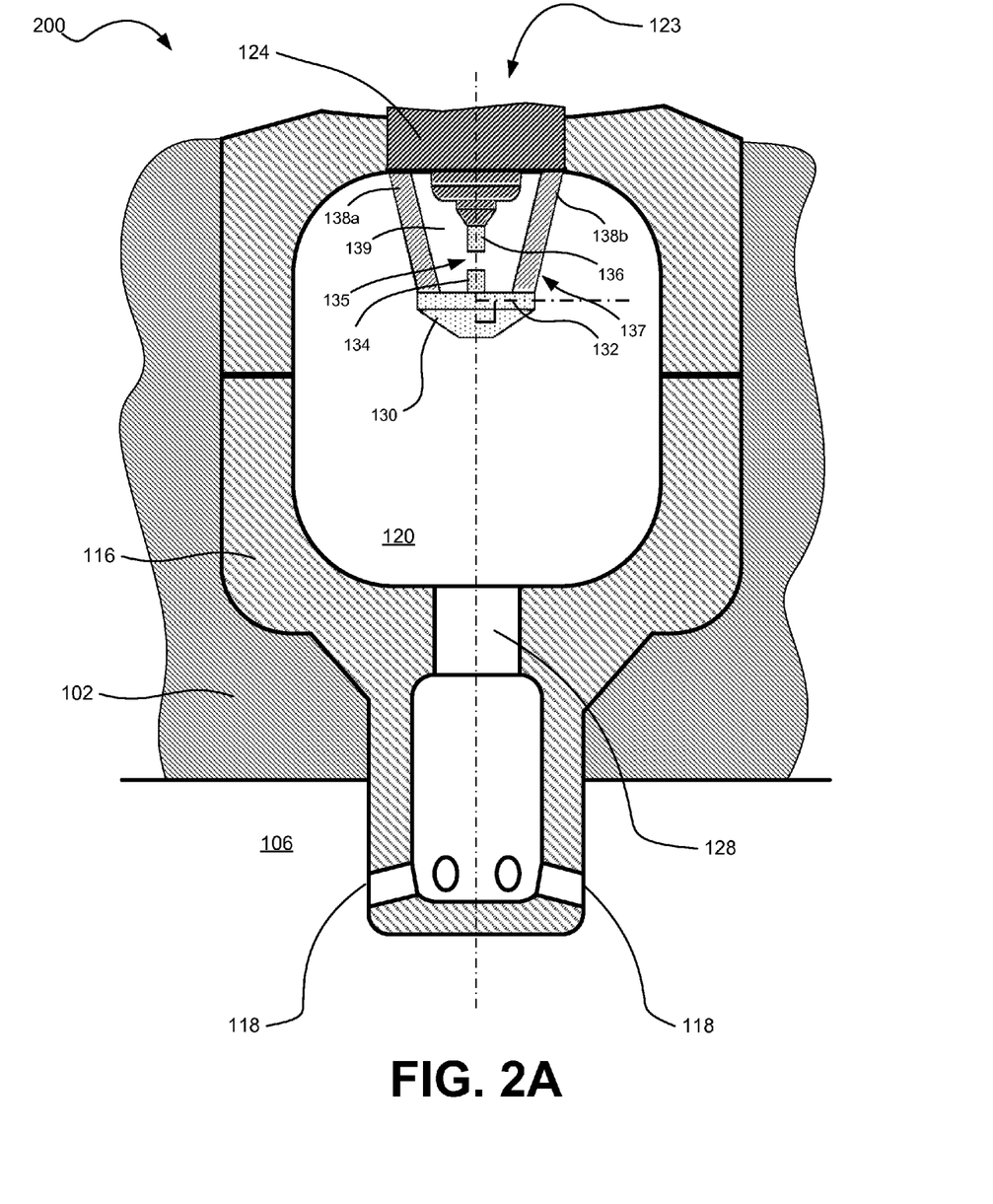
FIG. 2A illustrates a cross-sectional view of a portion of a first example ignition system including a shielding cap.
Figure 2B:
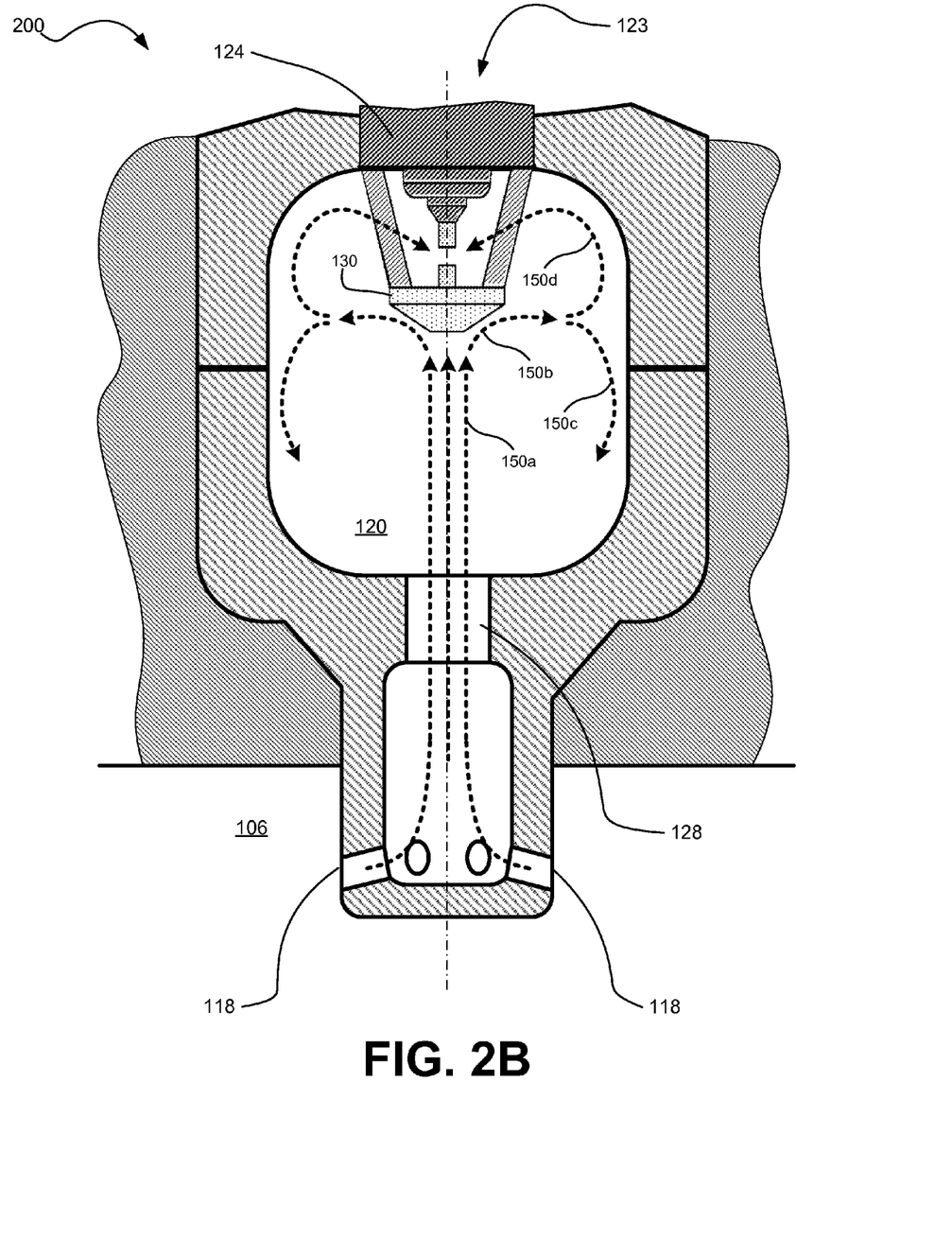
FIG. 2B illustrates a cross-sectional view of a portion of the first example ignition system showing example flow.
Figure 2C:
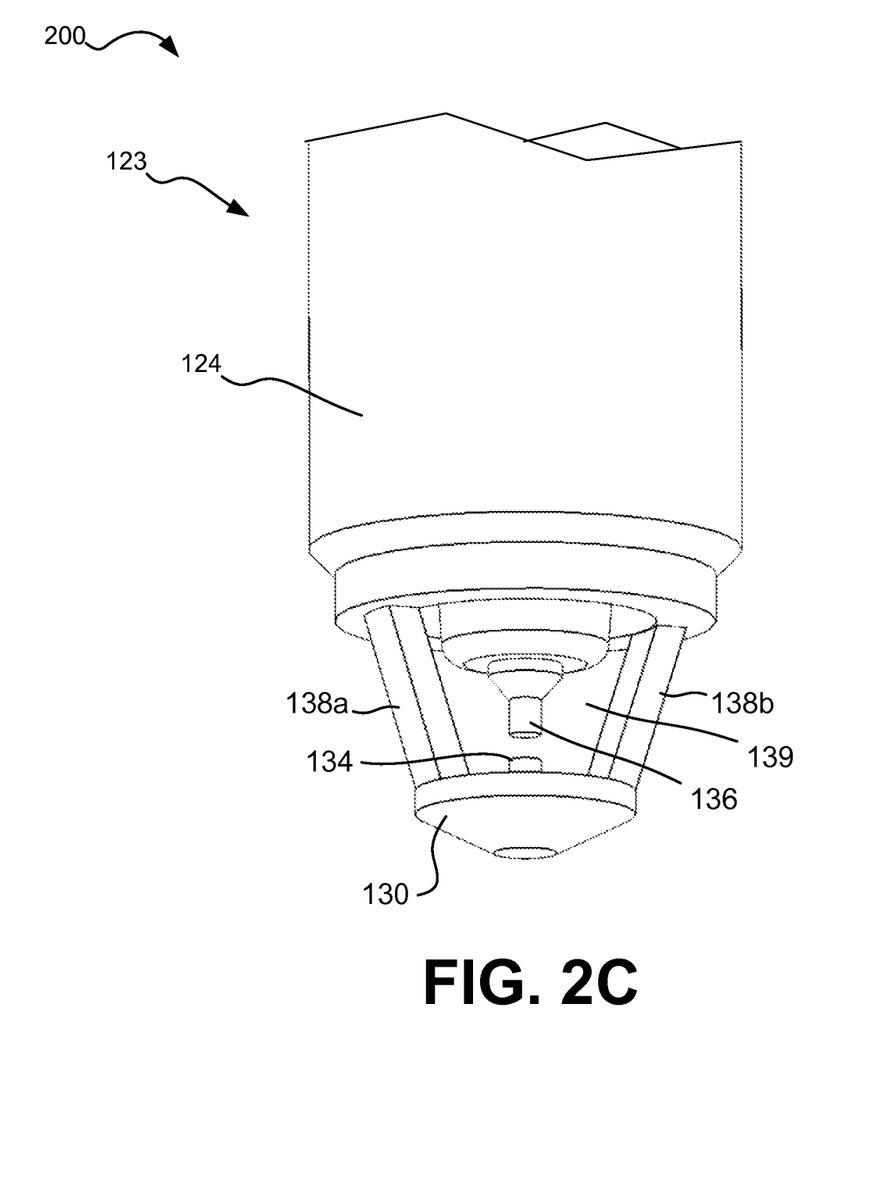
FIG. 2C illustrates a perspective view of a portion of the first example ignition system.

FIG. 2A-B illustrate cross-sectional views of portions of example ignition system 200. FIG. 2C illustrates a perspective detail view of igniter plug 123 of example ignition system 200. The example ignition system 200 can be used in an internal combustion engine such as engine 100. Ignition system 200 shown in FIG. 2A includes an igniter plug 123 received within a carrier 116. The ignition system 200 also includes a cap 130 at an end of the plug body 124 disposed within antechamber 120. The cap 130 is longitudinally spaced from the plug body 124 by a support 137 that includes legs 138a-b. The ignition system 200 also includes a first ignition body 136 and a second ignition body 134 adjacent the first ignition body 136 that define the flame kernel initiation gap 135. In some implementations, the first ignition body 136 and the second ignition body 134 are disposed between the plug body 124 and the cap 130. In some implementations, the first ignition body 136 is carried by the plug body 124. In some implementations, the second ignition body 134 is carried by the cap 130. In some implementations, both ignition bodies 134, 136 are carried by the plug body 124. In some implementations, one or both of the ignition bodies 134, 136 are carried by the support 137. In some implementations, the ignition system 200 includes more than two ignition bodies, e.g., three ignition bodies, four ignition bodies, etc. In some cases, the ignition bodies 134, 136 are in a J-gap configuration. In some implementations, one of the first ignition body 134 or the second ignition body 136 is a laser head.

The cap 130 is configured to shield the flame kernel initiation gap from incoming longitudinal flow. FIG. 2B illustrates ignition system 200, with arrows 150a-c indicating portions of flow. For example, the incoming flow can be the incoming air/fuel mixture directed at the plug body 124 from the internal nozzle portion 128, as described previously. The incoming longitudinal flow is shown in FIG. 2B with arrow 150a. The cap 130 blocks or redirects the flow from impinging directly onto the flame kernel initiation gap 135. The redirected flow is shown in FIG. 2B with arrow 150b. By shielding the flame kernel initiation gap from incoming flow, the cap 130 is able to reduce turbulence behind the cap 130 and create a quiescent zone around the flame kernel initiation gap 135. A first portion of the redirected flow recirculates into the antechamber 120, shown by arrow 150c. A second portion of the redirected flow recirculates into the region around the gap 135 with a relatively low flow velocity, shown by arrow 150d. The quiescent zone around the flame kernel initiation gap can allow healthier flame kernel growth with less chance of quenching and provide fresh charge into and the removal of residuals from the flame kernel initiation gap region. In some implementations, the use of a cap 130 can allow ignition with less laser power and reduced chance of quenching.

Figure 2D:
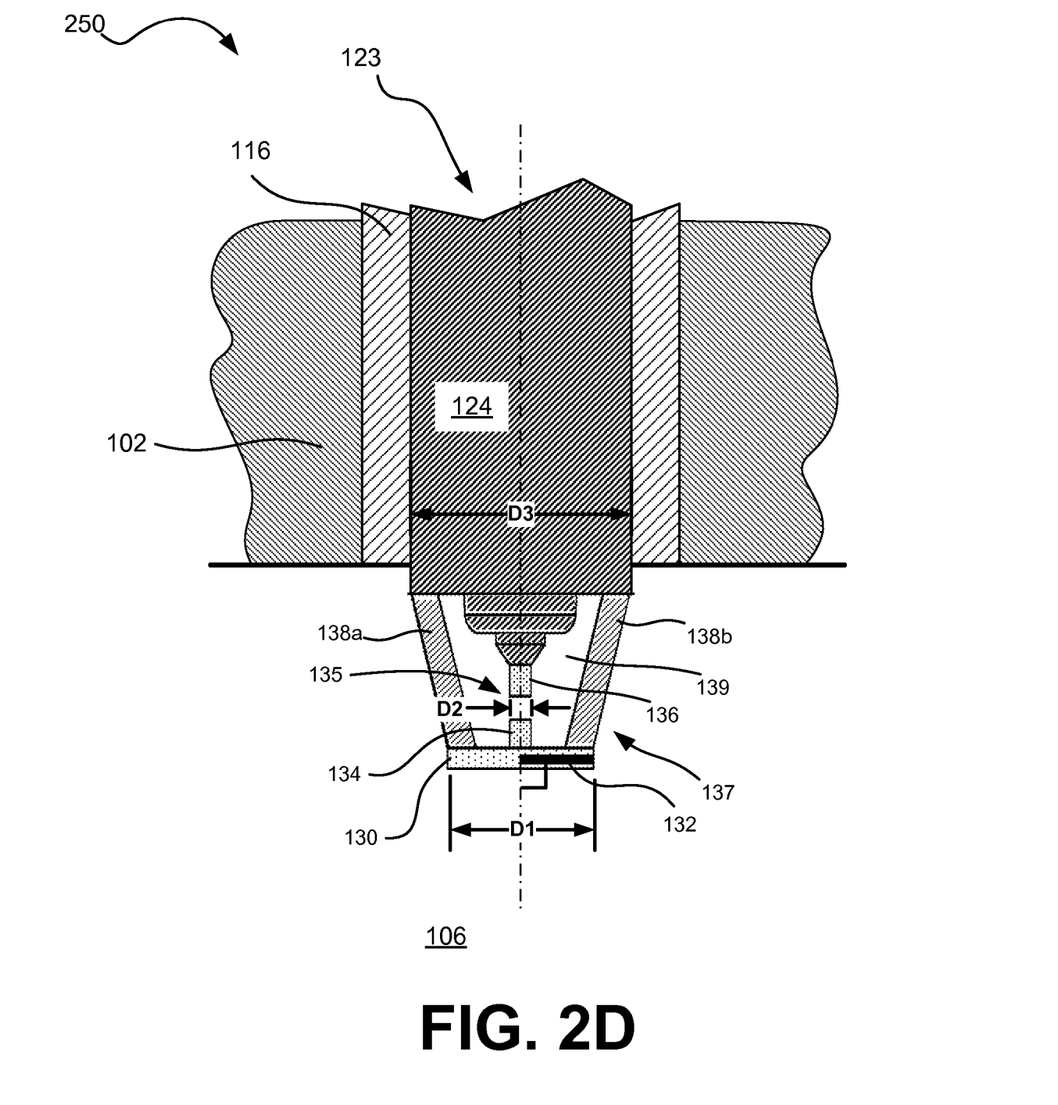
FIG. 2D illustrates a cross-sectional view of a portion of a second example ignition system including a shielding cap.

The cap 130 provides a transverse shielding surface. The cap 130 has a radial 132 that extends radially from the center of the cap 130 to the perimeter of the cap 130. In some implementations, the cap 130 has a frustoconical shape with a radial 132 perpendicular (precisely or substantially) to the center longitudinal axis. In some implementations, the radial 132 of cap 130 is at a non-zero, non-90 degree angle with respect to the center longitudinal axis. The cap 130 can also have a disc shape, dome shape, cylindrical shape, conical shape, prismatic shape, polyhedral shape, irregular shape, or another shape or combination of shapes. In some implementations, the cap 130 is not apertured. In some cases, the transverse diameter D1 (an example shown in FIG. 2D) of the cap 130 is greater than the transverse diameter D2 (c.f., FIG. 2D) of the first ignition body 136 and less than the transverse diameter D3 (c.f., FIG. 2D) of the igniter plug 123. In some cases, for a relatively small igniter plug 123, the diameter D3 of the igniter plug 123 is less than the diameter D1 of the cap. Configured in this manner, the diameter D1 of the cap 130 is large enough to protect the flame kernel initiation gap 135 from impinging flow, but small enough to allow the cap 130 to be inserted through carrier 116 and into a receiving chamber (e.g., antechamber 120, combustion chamber 106, or another chamber).

In some cases, the cap 130 is shaped to generate, re-enforce, or enhance the incoming flow of air/fuel mixture to be aerodynamically directed lateral to the center longitudinal axis. The incoming air/fuel mixture can be redirected from the cap 130 laterally into the antechamber 120. A portion of the redirected air/fuel mixture enters the region around the flame kernel initiation gap 135 through peripheral opening 139 (described below), where it is ignited. Another portion of the redirected air/fuel mixture can circulate in a toroidal vortex around the outer perimeter of the antechamber 120. For example, the antechamber 120 walls can guide the circulating flow to re-enter the flow from the internal nozzle portion 128 orthogonally (precisely and/or substantially) to the primary direction of flow or generally in the primary direction of the flow from the internal nozzle portion 128 (i.e., not counter to the primary direction of flow). Recombining the flow in this manner does not substantially counter the incoming flow, and thus substantially maintains the flow velocity from the internal nozzle portion 128 to the igniter plug 123 that sweeps residuals in front of the igniter plug 123. The resulting circulation creates a toroidal vortex of flow in the antechamber 120 that provides a controlled degree of turbulence within the antechamber 120. The turbulence from the circulating flow sweeps the flame out of the flame initiation region and into the antechamber 120 to mix in the antechamber 120 and ignite the air/fuel mixture in the antechamber 120. Also, as the central flow and the vortex flow meet, the mixing of the flows creates turbulence which can accelerate combustion. Finally, the toroidal vortex confines residual combustion gasses within the circulation in the antechamber 120, away from the flame kernel initiation gap 135.

The example support 137 connecting the cap 130 to the plug body 124 includes two legs 138a-b extending between the cap 130 and the plug body 124. The example legs 138a-b are radially offset from the center longitudinal axis. In other implementations, the support 137 can include another number of legs, e.g., one leg, three legs, six legs, or another number. In some implementations, the support 137 includes multiple radially offset legs. For example, the support 137 can include multiple legs which are circumferentially spaced apart. In some implementations, different legs can have different positions or shapes. For example, the legs can be spaced evenly apart or have different spacings between adjacent legs. Different legs can also be connected to the cap 130 and/or the plug body 124 at different radial positions. A leg can be curved, angled, straight, or have an irregular shape. A leg can be parallel (precisely or substantially) to the center longitudinal axis or angled with respect to the center longitudinal axis.

The support 137 defines a peripheral opening 139 around a perimeter of the cap 130. For example, the support 137 shown in FIG. 2A defines a peripheral opening 139 that is interrupted by legs 138a-b. The majority of the region surrounding the flame kernel initial gap is open to the surrounding chamber (e.g., antechamber 120 in FIG. 2A, combustion chamber 106 in FIG. 2D). For example, the area of the outer surfaces of the legs 138a-b is less than the area of the peripheral opening 139 defined by the support 137. Thus, charge, flame, and residuals can flow between the flame kernel initiation gap 135 and the surrounding chamber. The flame kernel is protected from impinging flow by the cap 130, but is substantially unobstructed during flame kernel growth. The flame kernel can grow and expand into the antechamber 120, where it can begin combustion of the air/fuel in the antechamber 120. In some cases, a total radially-facing area of the support 135 is less than a total area of the peripheral opening 139. In some cases, the peripheral opening 139 has a larger total area than the total area of outward-facing surfaces of the support 137.

The example ignition system 250 shown in FIG. 2B is substantially similar to ignition system 200 of FIGS. 2A-2C, except that the cap 130 is a disc-shaped body with a radial 132 perpendicular (precisely or substantially) to the center longitudinal axis and the end of the igniter plug 123 including the cap 130 and flame kernel initiation gap 135 is disposed within combustion chamber 106. The ignition system 250 does not include an antechamber. In this manner, the cap 130 is open and does not create a second pressure chamber different from the main combustion chamber. The cap 130 in ignition system 250 shields the flame kernel initiation gap 135 from impinging flow from within the combustion chamber 106. For example, the cap 130 can protect the flame kernel initiation gap 135 from bulk fluid flow in the combustion chamber 106.

Figure 3:
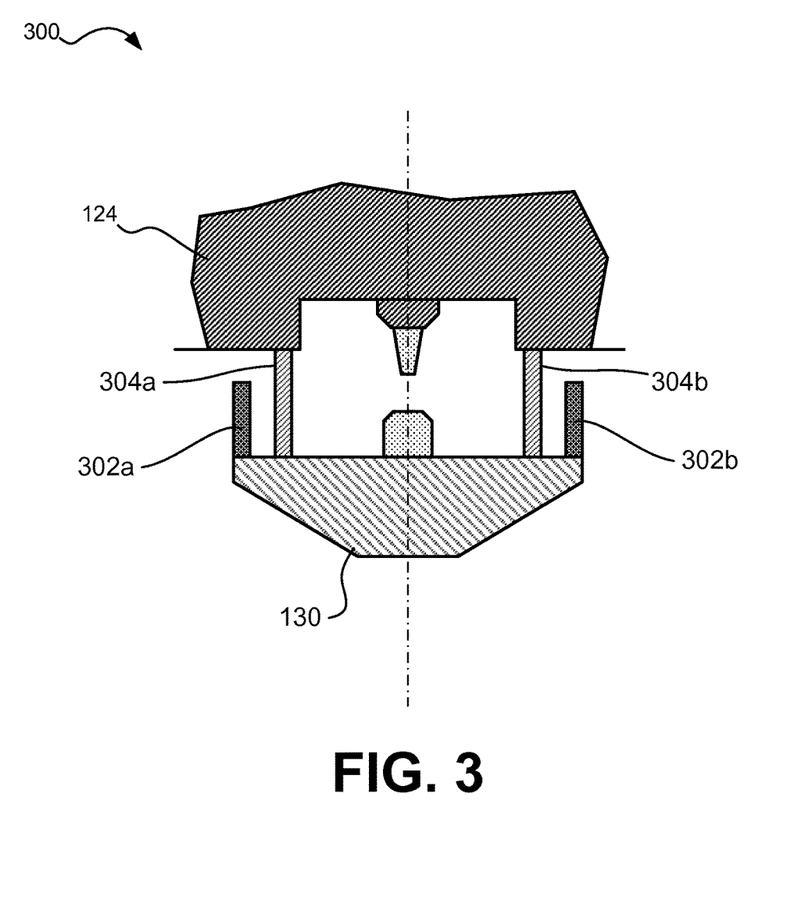
FIG. 3 illustrates a cross-sectional view of a portion of a third example ignition system including a shielding cap and peripheral shields.

FIG. 3 shows a cross-sectional view of a portion of example ignition system 300. Ignition system 300 is substantially similar to ignition systems shown in FIGS. 1-2, except that ignition system 300 also includes example peripheral shields 302a-b. Ignition system 300 includes a cap 130 supported to plug body 124 by legs 304a-b. The legs 304a-b are parallel (substantially or precisely) to the center longitudinal axis. The peripheral shields 302a-b are bodies spaced radially around the cap 130 that extend longitudinally from the cap 130 toward the plug body 124. The peripheral shields 302a-b provide additional shielding for the flame kernel initiation gap from impinging flow. For example, the peripheral shields 302a-b can shield the flame kernel initiation gap from lateral flow. Example ignition system 300 shows two legs 304a-b and two shields 302a-b, but other implementations can include more or fewer legs and/or shields. In some implementations, some or all of the peripheral shields extend longitudinally from the plug body 124 toward the cap 130. The peripheral shields can be flat, curved, angled, irregular, or have another shape. In some implementations, the peripheral shields 302a-b are angled with respect to the center longitudinal axis. The peripheral shields 302a-b can be evenly spaced or unevenly spaced around the center longitudinal axis. The peripheral shields 302a-b can be positioned radially inward of the support and/or radially outward of the support. In some implementations, the peripheral shields 302a-b have different radial offsets. In some implementations, a single shield partially surrounds a portion of the center longitudinal axis or completely surrounds the center longitudinal axis.

Figure 4A:
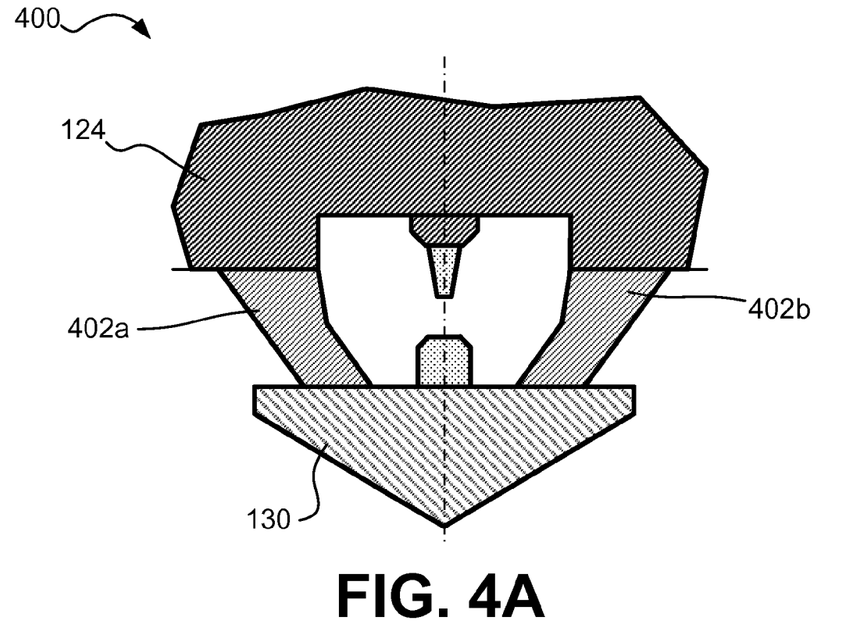
FIG. 4A illustrates a cross-sectional view of a portion of a fourth example ignition system including a shielding cap.
Figure 4B:
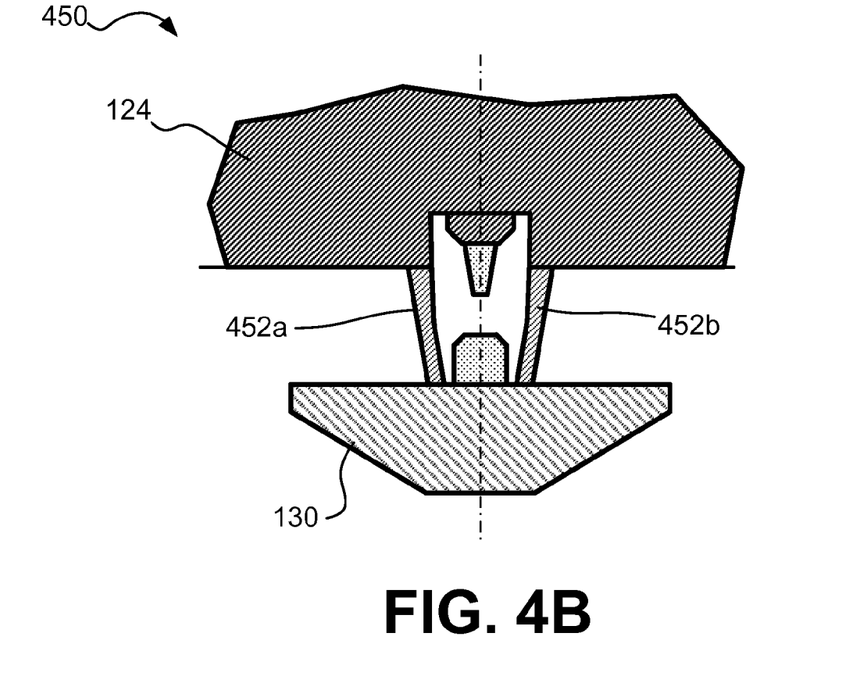
FIG. 4B illustrates a cross-sectional view of a portion of a fifth example ignition system including a shielding cap.

FIGS. 4A-B show a cross-sectional views of portions of example ignition systems 400, 450, respectively. The ignition system 400 is substantially similar to ignition systems shown previously in this disclosure, except that the cap 130 has a conical shape and the legs 402a-b supporting the cap 130 have an angled shape with a relatively large radial offset at the plug body 124 and a relatively small radial offset at the cap 130. The angled shape of the legs 402a-b and the conical shape of the cap 130 can facilitate redirection of oncoming longitudinal flow away from the flame kernel initiation gap in a lateral direction. The ignition system 450 is substantially similar to ignition systems shown previously in this disclosure, except that legs 452a-b are positioned adjacent to the flame kernel initiation gap. By positioning the legs 452a-b close to the flame kernel initiation gap, the legs 452a-b can provide additional shielding and containment of the quiescent zone. In this manner, the support and its legs can be configured, positioned, or shaped in different ways to provide different features, including those not shown.

A number of examples have been described. Nevertheless, it will be understood that various modifications may be made. Accordingly, other examples are within the scope of the following claims.

We claim:

1. A system for igniting a mixture in a main combustion chamber of an internal combustion engine, the system comprising:
   an elongate plug body generally residing around a center longitudinal axis and adapted to couple to the internal combustion engine;
   a first ignition body residing about an end of the plug body;
   a second ignition body adjacent the first ignition body to define a flame kernel initiation gap between the second ignition body and the first ignition body;

a transversely extending unapertured cap at the end of the plug body longitudinally spaced from the plug body by a support comprising a leg that is radially offset from the center longitudinal axis, the support defining a peripheral opening around a perimeter of the cap where a total radially-facing area of the support is less than a total area of the peripheral opening, and where the smallest transverse dimension of the cap is greater than the maximum transverse dimension of the first ignition body and maximum transverse dimension of the second ignition body and where a portion of the cap extends beyond the second ignition body in all radial directions from the center longitudinal axis; and an enclosure receiving the elongate plug body, the enclosure comprising a jet passage and defining a chamber about the end of the plug body that encloses the first and second ignition bodies and the unapertured cap, the chamber adapted to receive a flow from the main combustion chamber through the jet passage, and the jet passage comprises a nozzle portion configured to direct the flow along a trajectory to the unapertured cap.

2. The system of claim 1, where the leg is a first leg of a plurality of circumferentially spaced apart legs comprising the support.

3. The system of claim 1, where the cap is a solid, unapertured disc shape having a radial perpendicular to the center longitudinal axis.

4. The system of claim 1, where the cap has a frustoconical shape having a radial perpendicular to the center longitudinal axis and decreasing in diameter on a side of the cap opposite the second ignition body.

5. The system of claim 1, where the second ignition body is carried by the cap.

6. The system of claim 1, where the transverse diameter of the cap is greater than the transverse diameter of the first ignition body and the second ignition body, and less than the transverse diameter of the plug body.

7. The system of claim 1, where the cap is positioned to shield the flame kernel initiation gap from flow in the direction of the longitudinal axis.

8. The system of claim 1, where the first ignition body and the second ignition body are disposed between the plug body and the cap.

9. A method of igniting an air/fuel mixture in an internal combustion engine, the method comprising:

receiving the air/fuel mixture from a main combustion chamber of the internal combustion engine into an enclosure receiving the plug body, the enclosure defining a chamber about the end of the plug body receiving the air/fuel mixture into the chamber and enclosing the flame kernel initiation gap;

directing the air/fuel mixture received into the enclosure to impinge on a transversely extending cap at the end of a plug body of an ignition plug, the cap longitudinally spaced from the plug body by a support comprising a leg that is radially offset from a center longitudinal axis, where the support defines a peripheral opening around a perimeter of the cap where a total radially-facing area of the support is less than a total area of the peripheral opening, and where the smallest transverse dimension of the cap is greater than the maximum transverse dimension of a first ignition body and maximum transverse dimension of the second ignition body, where the air/fuel mixture is received into the chamber by a jet passage fluidly connecting the chamber and the main combustion chamber and directed along a trajectory to the transversely extending cap by a nozzle of a jet passage;

laterally deflecting the air/fuel mixture with the transversely extending cap while allowing a portion of the air/fuel mixture to flow into a flame kernel initiation gap between the first ignition body and a second ignition body of the ignition plug through the peripheral opening, the first and second ignition bodies disposed opposite the cap from the direction of incoming air/fuel mixture and where a portion of the cap extends beyond the second ignition body in all radial directions from the center longitudinal axis; and igniting the air/fuel mixture in the flame kernel initiation gap.

10. The method of claim 9, where the air/fuel mixture received into the chamber is directed along the center longitudinal axis toward the transversely extending cap.

11. The method of claim 9, where the cap is disposed within the chamber.

12. The method of claim 9, where the leg is a first leg of a plurality of circumferentially spaced apart legs comprising the support.

13. The method of claim 9, where the cap is a solid, unapertured disc shape having a radial perpendicular to the center longitudinal axis.

14. The method of claim 9, where the cap has a frustoconical shape having a radial perpendicular to the center longitudinal axis and decreasing in diameter on a side of the cap opposite the second ignition body.

15. The method of claim 9, where the second ignition body is carried by the cap.

16. An internal combustion engine, comprising:
an elongate ignition plug comprising:
a first body defining a first electrode residing about an end of the ignition plug;
a second body defining a second electrode adjacent the first electrode; and
a transversely extending shield at the end of the ignition plug, the shield carried by a support defining a peripheral open area that is greater than a total radially-facing area of the support in the peripheral open area, and where the smallest transverse dimension of the cap is greater than the maximum transverse dimension of the first ignition body and maximum transverse dimension of the second ignition body and where a portion of the cap extends beyond the second ignition body in all radial directions from the center longitudinal axis; and
an enclosure receiving the elongate ignition plug, the enclosure comprising a nozzle portion and defining a chamber about the end of the elongate ignition plug that encloses the first and second bodies and the transversely extending shield, the chamber adapted to receive a flow from the main combustion chamber through the nozzle portion, and the nozzle portion adapted to direct the flow along a trajectory to the unapertured cap.

17. The system of claim 1, where the second ignition body extends axially along the center longitudinal axis.

18. The system of claim 1, where the cap is a solid, unapertured disk-shape, and where the second ignition body is carried by the cap and extends from the cap toward the first ignition body.

* * * * *

UNITED STATES PATENT AND TRADEMARK OFFICE
CERTIFICATE OF CORRECTION

PATENT NO. : 9,653,886 B2  
APPLICATION NO. : 14/664431  
DATED : May 16, 2017  
INVENTOR(S) : Domenico Chiera and Gregory James Hampson Page 1 of 1

It is certified that error appears in the above-identified patent and that said Letters Patent is hereby corrected as shown below:

On the Title Page

Item (56), Other Publications:
Page 4, Column 2, Line 24, delete "Seou1" and insert --Seoul--.

In the Specification

Column 3, Line 42, delete "FIG." and insert --FIGS--.

Column 4, Line 36, delete "disc shape" and insert --disc-shape--.

In the Claims

Column 7, Line 3, Claim 9, delete "the plug body" and insert --a plug body of an ignition plug--.

Column 7, Line 26, Claim 3, delete "disc shape" and insert --disc-shape--.

Column 7, Line 36, Claim 6, delete "body," and insert --body--.

Column 8, Line 25, Claim 13, delete "disc shape" and insert --disc-shape--.

Column 8, Line 26, Claim 16, delete "unapertured cap" and insert --shield--.

Column 8, Line 62, Claim 18, delete "disk-shape" and insert --disc-shape--.

Signed and Sealed this  
Eighteenth Day of December, 2018

Andrei Iancu  
*Director of the United States Patent and Trademark Office*